April 13, 1948. F. W. SCHWINN 2,439,755
QUADRICYCLE
Filed Sept. 28, 1945 3 Sheets-Sheet 1

INVENTOR.
Frank W. Schwinn
BY
Albert G. McCaleb
Atty.

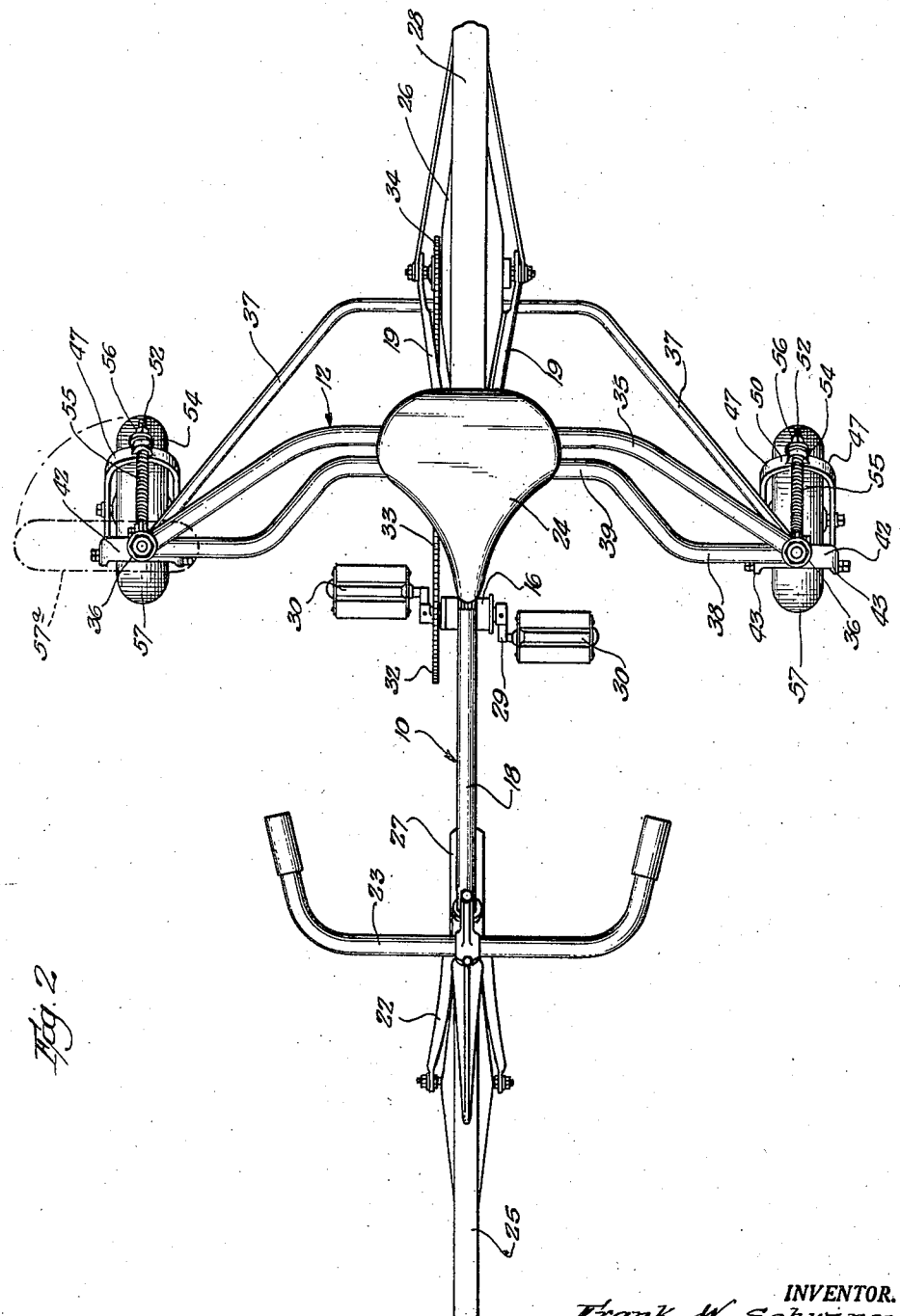

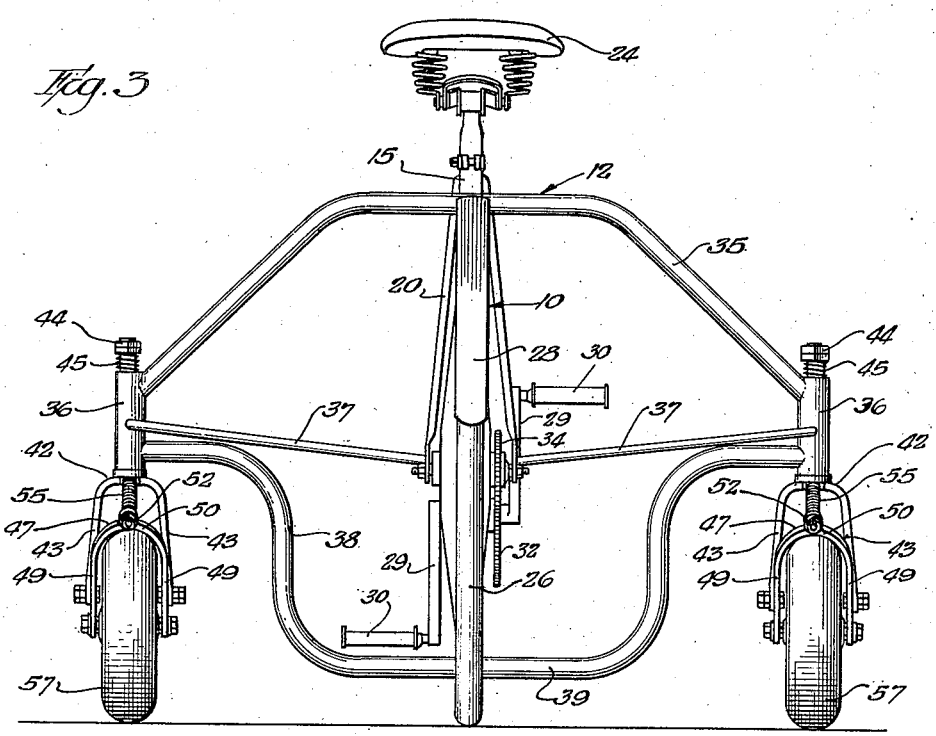

Patented Apr. 13, 1948

2,439,755

UNITED STATES PATENT OFFICE 2,439,755

QUADRICYCLE

Frank W. Schwinn, Chicago, Ill.

Application September 28, 1945, Serial No. 619,076

3 Claims. (Cl. 280—282)

This invention relates to quadricycles, and more particularly to such vehicles adapted to use somewhat in the manner of bicycles, but constructed and arranged with a view toward the provision of lateral stability and safety in use.

As a general object, my invention contemplates the provision of a quadricycle having operating parts and lateral proportions so designed with respect to the center of gravity of the vehicle and its rider that it will not tip over sidewise, even when sharply turned during operation at speeds which are high in relation to those of normal use.

My invention has for another object the provision of an improved vehicle suited to use for transportation and/or for the rehabilitation of leg muscles by those who are handicapped as a result of injury, disease or the like.

A further object of the present invention is to provide an improved vehicle having many of the characteristics of a bicycle, and additionally including effective lateral stabilizing elements in the form of self-steering caster type wheels and supports together with framework for the attachment of the wheels at positions promoting stability.

It is an additional object of this invention to provide an improved quadricycle having characteristics such that when turned sharply to one side or the other during forward movement at a speed sufficient to cause slippage or skidding, the vehicle will not only remain upright, but its rate of movement will be gradually checked.

Other objects and advantages of the invention will be apparent from the following description and the accompanying drawings in which similar characters of reference indicate similar parts throughout the several views.

Fig. 2 is a top plan view of the quadricycle shown in Fig. 1;

Fig. 3 is a rear elevational view of the quadricycle shown in Figs. 1 and 2, wherein the parts are depicted in their normal positions for straightforward movement; and Fig. 4 is a view similar to Fig. 3, but illustrative of positions of the parts which might occur during an abnormal condition of operation.

Figure 1:
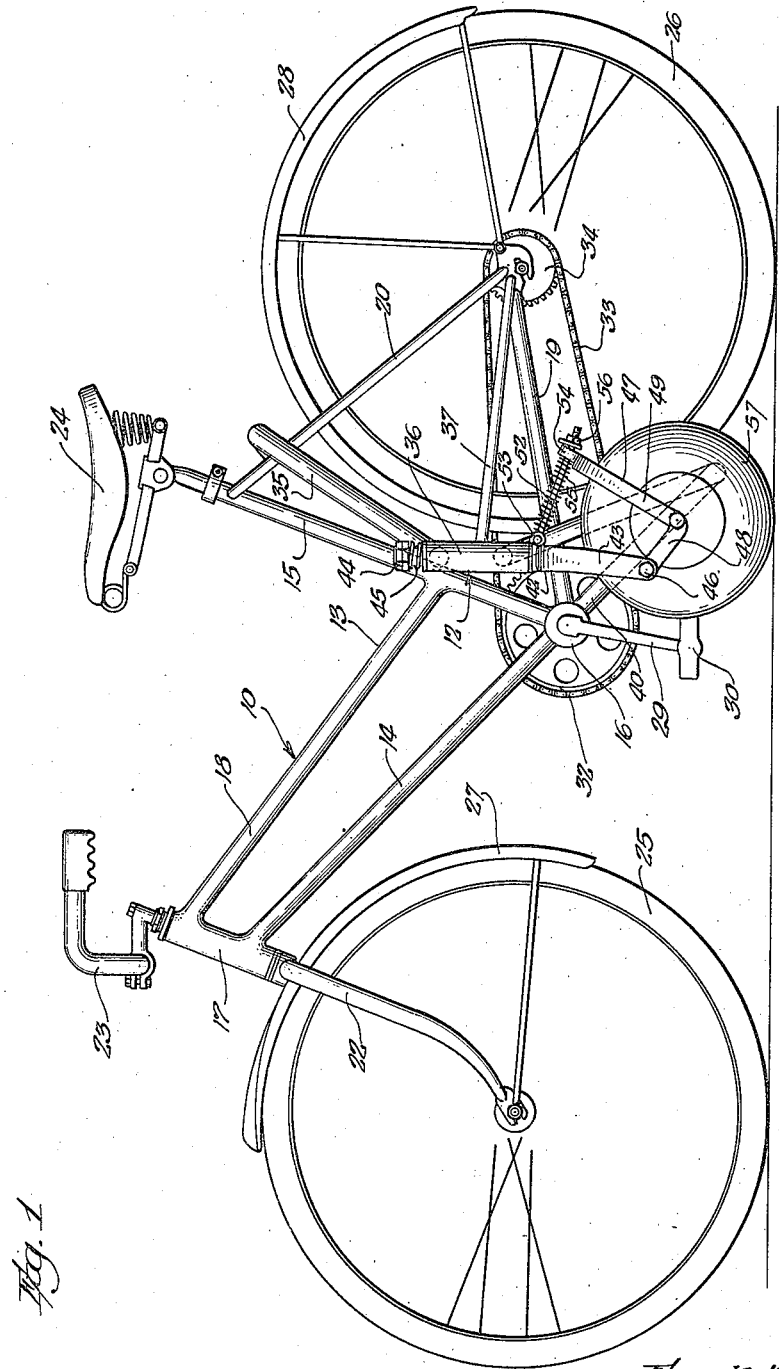
Fig. 1 is a side elevational view of one form of quadricycle which embodies my invention in a preferred form.

In general, the quadricycle which is disclosed herein for illustrative purposes, includes a main passenger-carrying structure 10 of bicycle-like construction, to which is attached a lateral stabilizing structure designated by the reference numeral 12 and preferably extending substantially equidistantly on both sides of the main passenger-carrying structure.

Desirably, the main passenger-carrying structure 10 includes a bicycle type of frame 13 having a down tube 14 and a seat mast 15 extending angularly from a crank hanger 16, and each having one end secured to the crank hanger. The other end of the down tube 14 terminates at and is secured to a head tube 17. A second down tube 18 has one end secured to the head tube 17 and its other end secured to the seat mast 15, and extends therebetween in spaced relationship to the lower down tube 14. Extending rearwardly from the crank hanger 16 is a rear fork 19 braced by stays 20 which are secured to the upper portion of the seat mast 15 and to the outer ends of the fork 19. A front fork 22 is supported for rotary movement by suitable bearings disposed within the head tube 17 and has secured to the upper end thereof handle bars 23 for steering the vehicle. A resiliently supported seat 24 is adjustably carried at the upper end of the seat mast 15.

Normally aligned front and rear wheels 25 and 26 of relatively large diameter are rotatably mounted in the front fork 22 and rear fork 19, respectively. Although not essential, the front and rear wheels 25 and 26 desirably have portions covered by the usual types of bicycle mudguards 27 and 28, respectively.

For propelling the disclosed quadricycle, a crank 29 is rotatably supported by suitable bearings in the crank hanger 16 and in the disclosed form has pedals 30 secured to the outer ends of the crank arms and a sprocket 32 secured thereto adjacent one side of the crank hanger. When the vehicle is particularly adapted to use by a person having only one leg, one pedal may be eliminated and suitable known means provided for accomplishing the operation of the sprocket through force supplied to only the one pedal. A chain 33 provides a driving connection between the sprocket 32 and a second sprocket 34 which is drivingly connected to the rear wheel through means such as a coaster brake.

It may well be understood that although a particular type of bicycle structure has been shown and described for purposes of illustration, that portion of the structure is merely exemplary of one suitable to the practice of my invention.

Similarly, there are various ways in which side wheels might be attached to the main passenger-carrying structure to provide lateral stability of the vehicle. In my preferred embodiment, however, the lateral stabilizing structure 12 includes a curved lateral frame tube 35 having its mid-portion secured to the frame 13 and extending outwardly and downwardly therefrom to laterally aligned positions substantially equidistantly spaced from opposite sides of the frame 13. At its outer ends the lateral frame tube 35 has secured thereto vertically disposed end bearing tubes 36. The end bearing tubes 36 are additionally supported by braces 37 secured to and extending between the side bearing tubes 36 and the rear end portions of the rear fork 19. A cross brace 38 is secured to and extends between the side bearing tubes 36 and has its mid-portion 39 offset rearwardly and downwardly from the end portions to provide ample clearance for the crank 29, the pedals 30 and their operation. As shown in Fig. 1, the mid-portion 39 of the cross brace 38 may be connected to the crank hanger 16 by a brace 40 to rigidify and strengthen the structure.

Each of the side bearing tubes 36 has rotatably supported therein the upper end of a side fork 42, said fork having downwardly projecting and laterally spaced legs 43 and being resiliently held in place with respect to the side bearing tube by nuts 44 threaded onto the upper end of the fork and abutting a compression spring 45 which is interposed between one of the nuts and the upper end of the side bearing tube. Rotatably connected to the lower ends of the legs 43 of each of the side forks 42, by fastening means such as bolts 46, is an auxiliary fork 47 which is desirably integrally formed with side legs having angularly disposed portions 48 and 49. In the preferred embodiment of my invention, the portion 48 of each side leg normally extends rearwardly and somewhat downwardly from the ends of the fork legs 43, while the portions 49 of the side legs extend upwardly and are joined by an integral connecting portion 50. At their upper ends the side fork 42 and auxiliary fork 47 are movably connected by a link in the form of a rod 52 having one end rotatably supported by a bearing 53 on the side fork 42, and its other end extending through a collar 54 on the connecting portion of the auxiliary fork. A compression spring 55 encircles the rod 52 and is interposed between the bearing 53 and the collar 54 to bias the upper end of the auxiliary fork 47 away from the side fork 42. Outward movement of the auxiliary fork 47, effected by the biasing force of the spring 55, is adjustably limited by means such as a nut 56 threaded on to the end of the rod 52.

A relatively small side wheel 57 is rotatably secured to each of the auxiliary forks 47 with its axis of rotation disposed at or near the vertex of the angularly disposed portions 48 and 49 of the side legs. With the side wheels 57 secured at this position to the auxiliary forks 47, at least two particularly desirable results are accomplished. In the first place, the axis of rotation of each of the side wheels is displaced from the rotational axis of its associated side fork 42 to provide a castor-like mounting such that the side wheels will be self-steering and will follow the guided directions of the vehicle. In the second place, the rotatably connected side and auxiliary forks 42 and 47, together with the compression spring 55 and associated rod 52 provide a linkage including a resilient element which permits independent vertical movement of each of the side wheels relative to the lateral frame members and the main passenger-carrying portion of the vehicle. The normal vertical position of each of the side wheels is adjustable so that they both are biased against the surface of the roadway even when minor surface irregularities are encountered. Also, the extreme upper position of each of the side wheels is limited to a stable position of the vehicle by the length and stiffness of the spring 55.

In order to promote lateral stability at a particularly effective position, that position is desirably selected in relation to the combined center of gravity of the vehicle and its rider. The distance outwardly of the side wheels 57 from the main frame is selected to counteract the forces encountered when the vehicle is turned sharply to one side or the other during its forward movement at high speed. In order to provide equal stability in both lateral directions, the side wheels are equidistantly spaced from the two sides of the main frame.

There is an additional consideration which is important in the selection of the position of the side wheels to provide the desired lateral stability. This consideration relates to the disposition of the side wheels longitudinally of the vehicle. Since the combined center of gravity of the rider and vehicle is near the longitudinal position of the rider, it is preferable that the side wheels are longitudinally disposed between the axes of the main passenger-carrying wheels 25 and 26. For providing the desired stability as well as for structural reasons, the side wheels 57 of the disclosed embodiment of my invention are in approximate lateral alignment with the seat 24. Being disposed in these positions, the side wheels are located close to the line of maximum lateral thrusts and are constantly in a position to resist those thrusts and thereby to stabilize the vehicle in operation. Also, being in the positions disclosed, the lateral frame tube 35 is conveniently secured to the rear stays 20 near the seat. Furthermore, the cross brace 38 extends laterally between the end bearing tubes 36 and is attached to the main frame without interfering with the operation of the crank and pedals.

Since the side wheels 57 are mounted in castor-type supports and are rotatable relative to the lateral frame members, they may be turned to positions such as that indicated in dot and dash lines at 57a in Fig. 2. This ability to turn and to follow the course of the vehicle even in abnormal conditions is another factor contributing to the desired safe and stable operation of the vehicle. When the vehicle is proceeding forwardly in normal operation and then, because of an emergency or for any reason, is turned sharply to the right or left, the stabilizing effect of the lateral stabilizing structure counteracts the centrifugal forces resulting from the turn. If the speed of the vehicle is sufficient, sidewise skidding of the main load-carrying wheels may result; but with the vehicle remaining upright, as it will in this instance, the frictional force of the skidding will tend only to reduce the speed of the vehicle.

An exemplary illustration of the type of operation encountered during a sharp right turn when moving forwardly at relatively high speed is depicted in Fig. 4. During a sharp right turn, such as that depicted, the stabilizing forces on the right hand wheel 57 will exceed those on the left hand stabilizing wheel to the extent that the right hand wheel will be forced upwardly in its resilient mounting and relative to the lateral frame to an extent such that the opposite stabilizing wheel may be raised from the roadway. Such operation is advantageous to stability since any skidding will be toward the left and the castor-type mounting of the side wheels with their axes of rotation displaced from their axes of turning movement will cause those wheels to follow the combined forward turning and/or skidding movement during a gradual decrease of the speed, and will thus avoid the probability of skidding of the side wheels and anything that might suddenly stop their lateral movement. Thus, the castor-type supports and resilient mountings of the side wheels contribute advantageously to the provision of stability under abnormal as well as normal conditions of operation.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A quadricycle comprising, in combination, a main passenger carrying structure of bicycle-type construction including a frame carried by front and rear wheels of relatively large diameter and having handle bars for steering, a seat, and foot driven means drivingly connected to the rear wheel for propulsion; and a lateral stabilizing structure including an upper frame tube secured to said frame near the seat and extending outwardly and downwardly, rear braces secured to said frame near the axis of the rear wheel and extending outwardly and forwardly, vertically disposed end tubes secured to the ends of said upper frame tube and braces at positions spaced substantially equidistantly from opposite sides of the frame and in approximate lateral alignment with the seat, a cross brace extending between and having its ends secured to said end tubes, said cross brace being curved to provide clearance near said foot driven means, side wheel support forks rotatably mounted in said end tubes, means providing a linkage associated with each of said side wheel support forks and including resilient means and an auxiliary fork having angularly disposed side leg portions, said auxiliary forks being connected to the side wheel support forks for swinging movement about a horizontal axis and biased away from the side wheel support forks by said resilient means, and relatively small side wheels rotatably secured to the auxiliary forks with their axes of rotation to the rear of the axis of rotation of the side wheel support forks.

2. In a vehicle of the class described having a normal direction of forward movement, the combination comprising a frame extending laterally of said normal direction of forward movement and having at one end a vertically disposed side bearing support tube, a side wheel support fork having an end journaled for free rotational movement in said side bearing support tube and separated legs at its other end, an auxiliary fork having curved legs and a connecting portion, the ends of said curved legs being rotatably connected to the ends of the separated legs of said support fork and extending therefrom in a rearward direction with respect to said normal direction of movement, means including a resilient element movably connecting and resiliently separating said forks at a distance from their connected ends, and a wheel rotatably secured to the auxiliary fork at a position spaced from the connected ends of the forks so that the axis of the wheel is to the rear of the rotational axis of the wheel support fork.

3. In a quadricycle of the class described and having a main passenger carrying structure of bicycle-type construction including a frame carried by front and rear wheels, a seat, and foot driven means drivingly connected to the rear wheel for propulsion, the combination comprising an upper frame tube secured to said rear frame near the seat and extending outwardly and downwardly, rear braces secured to said frame near the axis of the rear wheel and extending outwardly and forwardly, vertically disposed end tubes secured to the ends of said upper frame tube and braces at positions spaced substantially equidistantly from opposite sides of the frame and in approximate lateral alignment with the seat, side wheel support forks mounted in said end tubes for free rotation relative thereto and each having separated side legs, an auxiliary fork for each of said side wheel support forks and each having curved legs and a connecting portion, the ends of the curved legs of each of said auxiliary forks being rotatably connected to the side legs of one of the side wheel support forks, the curved legs of said auxiliary forks extending rearwardly and upwardly from the side wheel support forks, means including a resilient element movably connecting and resiliently separating each auxiliary fork from its side wheel support fork at a distance from the connected ends, and a wheel rotatably secured to each of the auxiliary forks at a position spaced rearwardly from the connected ends of the forks so that the axes of the wheels are to the rear of the rotational axes of the side wheel support forks.

FRANK W. SCHWINN.

REFERENCES CITED

The following references are of record in the file of this patent:

UNITED STATES PATENTS

| Number | Name | Date |
| --- | --- | --- |
| 476,297 | Overs | June 7, 1892 |
| 612,857 | Mackley | Oct. 25, 1898 |
| 1,065,936 | Gatermann | July 1, 1913 |
| 1,227,635 | Lake | May 29, 1917 |
| 2,051,627 | Weinmann | Aug. 18, 1936 |

FOREIGN PATENTS

| Number | Country | Date |
| --- | --- | --- |
| 518,375 | Great Britain | Feb. 26, 1940 |